(12) United States Patent
Gerard

(10) Patent No.: US 12,123,850 B1
(45) Date of Patent: Oct. 22, 2024

(54) SYSTEM AND METHOD FOR TESTING INHOMOGENEITIES IN A FLUID WITHIN A CONDUIT

(71) Applicant: Tech Professional Service Tools Corporation, Hialeah, FL (US)

(72) Inventor: Elliot Gerard, North Miami, FL (US)

(*) Notice: Subject to any disclaimer, the term of this patent is extended or adjusted under 35 U.S.C. 154(b) by 0 days.

(21) Appl. No.: 18/663,973

(22) Filed: May 14, 2024

Related U.S. Application Data

(60) Provisional application No. 63/466,550, filed on May 15, 2023.

(51) Int. Cl.
*G01N 29/032* (2006.01)

(52) U.S. Cl.
CPC .................. *G01N 29/032* (2013.01)

(58) Field of Classification Search
CPC ...................................................... G01N 29/32
See application file for complete search history.

(56) References Cited

U.S. PATENT DOCUMENTS

| | | |
|---|---|---|
| 4,138,879 A | 2/1979 | Liebermann |
| 4,235,095 A | 11/1980 | Liebermann |
| 4,392,374 A | 7/1983 | Liebermann |
| 2014/0096599 A1* | 4/2014 | Munch ............. G01N 29/032 73/61.79 |
| 2021/0116437 A1* | 4/2021 | Lie .................... G01N 29/48 |

* cited by examiner

*Primary Examiner* — Peter J Macchiarolo
*Assistant Examiner* — John M Royston
(74) *Attorney, Agent, or Firm* — Derek Fahey; The Plus IP Firm, PLLC

(57) ABSTRACT

A system and method for testing inhomogeneities in a fluid within a conduit and exhibiting an indication of any inhomogeneities within the fluid on a light emitting element, a graphical display, or an audio disseminator in a streaming fashion. The method is performed using a portable detector, which includes a pair of electromechanical transducers, a processor, and a display that are in electrical communication. The electromechanical transducers are acoustically coupled to the conduit. The system displays a graphical representation or a second graphical representation when an inhomogeneity is detected or not, respectively. The graphical representation and the second graphical representation are displayed graphically as they are determined in a streaming fashion. The representation of each inhomogeneity comprises an indicator on a graphical display and the light emitting element. The representation of each inhomogeneity includes an audio element emitted by audio disseminator for each inhomogeneity detected.

20 Claims, 15 Drawing Sheets

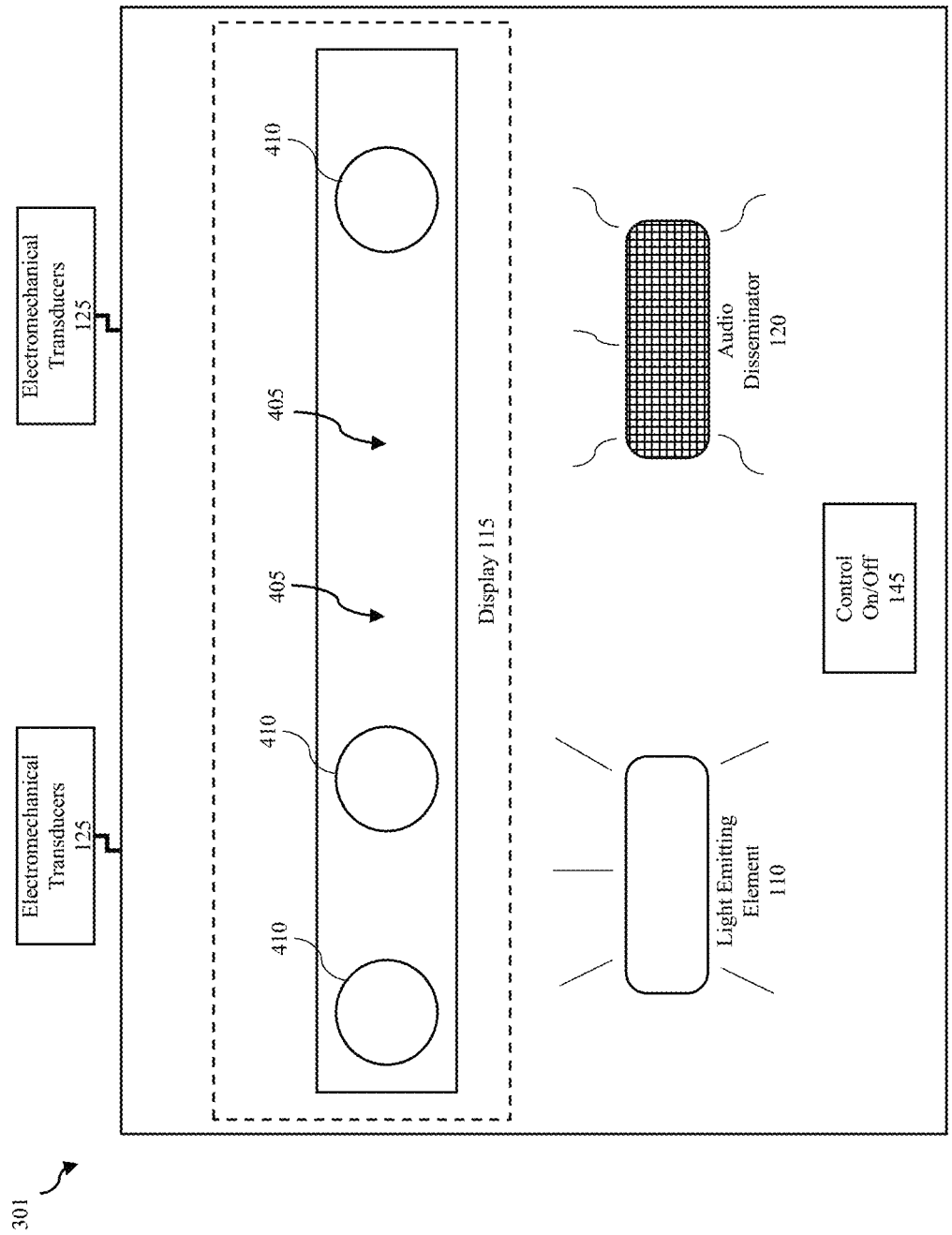

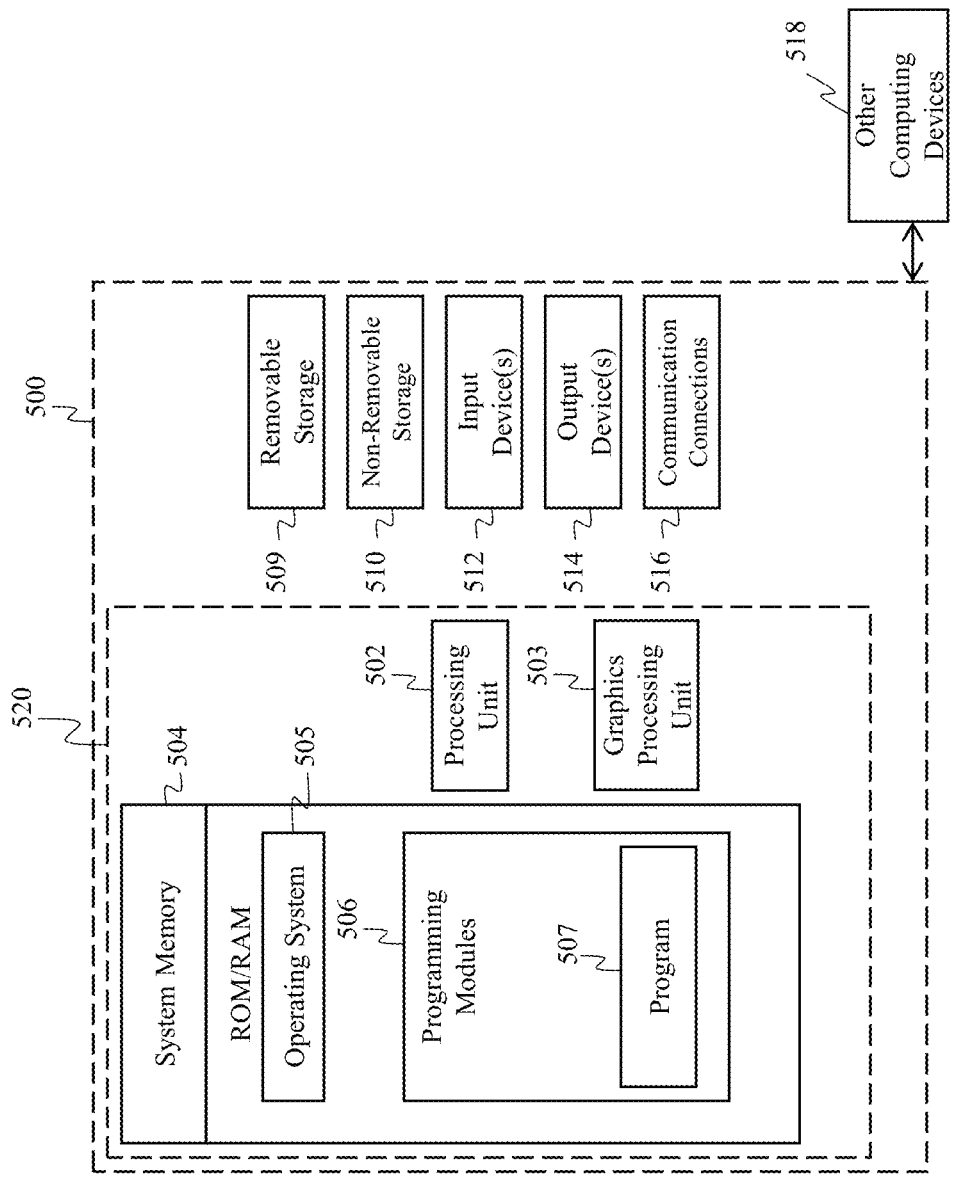

SYSTEM AND METHOD FOR TESTING INHOMOGENEITIES IN A FLUID WITHIN A CONDUIT

REFERENCE TO RELATED APPLICATIONS

This application claims the benefit of U.S. Provisional Application Ser. No. 63/466,550 titled "SYSTEM AND METHOD FOR TESTING INHOMOGENEITIES IN A FLUID WITHIN A CONDUIT" and filed May 15, 2023.

CROSS-REFERENCES

Not applicable.

TECHNICAL FIELD AND BACKGROUND OF THE INVENTION

The present disclosure relates to the field of electromechanical transducers, and more specifically to the field of electromechanical transducers for testing inhomogeneities.

Electromechanical transducers have been employed for various applications, including the detection of bubbles or gas pockets in conduits, pipelines, or vessels containing liquids. These transducers function by converting one form of energy, such as mechanical energy, into another form, such as electrical energy, and vice versa. In the context of bubble detection, ultrasonic transducers are commonly utilized due to their ability to generate and receive high-frequency sound waves.

Ultrasound technology use ultrasound, a high-frequency sound wave beyond the range of human hearing, which has been widely used for various applications, including medical imaging, non-destructive testing, and bubble detection. Ultrasonic transducers generate and receive these sound waves to inspect the internal structure of a material, detect defects, or identify the presence of bubbles.

Ultrasonic transducers function as both a transmitter and a receiver of ultrasonic waves. They typically consist of piezoelectric materials, which have the ability to generate an electrical charge when subjected to mechanical stress or to produce mechanical deformation when exposed to an electric field. In bubble detection, the transducer emits ultrasonic waves that travel through the conduit and are reflected back upon encountering a bubble or gas pocket. The returning echo is then detected by the same transducer.

In the time-of-flight method, to determine the presence of bubbles or gas pockets, the time taken by the ultrasonic waves to travel from the transducer to the bubble and back is measured. The time-of-flight information, along with the speed of sound in the liquid medium, can be used to estimate the location of the bubble within the conduit. In the pulse-echo technique, a short pulse of ultrasound is emitted by the transducer, which then listens for the returning echoes. The presence of bubbles or gas pockets can be inferred by analyzing the amplitude, frequency, or phase shifts in the returned echoes. In the transmission method, two transducers are placed on opposite sides of the conduit, with one acting as a transmitter and the other as a receiver. The presence of bubbles or gas pockets can be detected by monitoring changes in the transmission of ultrasound between the two transducers.

The development of electromechanical transducers for testing bubbles in conduits has been driven by the need for non-invasive, non-destructive, and real-time methods of monitoring and inspecting fluid flow systems. Applications include process industries, oil and gas pipelines, water distribution systems, air conditioner systems, and medical devices such as intravenous lines and dialysis equipment.

U.S. Pat. Nos. 4,138,879, 4,235,095 and 4,392,374 discloses a system for detecting inhomogeneities in a fluid within a conduit. In these systems a pair of electromechanical transducers are disposed on a fluid filled metal conduit in an acoustically coupled relationship. An adjustable-gain driving amplifier responsive to the output of one transducer for driving the other transducer has its gain automatically adjusted to maintain the oscillation. An indicating circuit detects the modulation of the driving signal. Inhomogeneities such as bubbles passing through the conduit near the transducers cause variations in the gain required to maintain the oscillation and are detected as modulations of the driving signal.

Although the prior art is capable of detecting bubbles, the resolution and consequential accuracy of the detection is limited, as the invention does not take into account that the modulation amplitude of the driving signal varies considerably depending on many factors, including the location and placement of the transducers, the size and thickness of the conduit tubing and the different types of components used in the AC refrigeration system.

As a result, there exists a need for improvements over the prior art and more particularly for a more efficient way of testing for inhomogeneities in a fluid within a conduit and indicating the presence of said inhomogeneities to a user.

BRIEF SUMMARY OF THE INVENTION

A system and method for testing inhomogeneities in a fluid within a conduit and exhibiting on a light emitting element, a graphical display or an audio disseminator any inhomogeneities within the fluid in a streaming fashion is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method for testing inhomogeneities in a fluid within a conduit and exhibiting by at least one of (i) a light emitting element, (ii) a graphical display and (iii) an audio disseminator any inhomogeneities within the fluid is disclosed. The method comprises sensing, using a pair of electromechanical transducers coupled to the conduit and a signal derived from the fluid within the conduit during a predetermined time period. The method further comprises transmitting the signal for the predetermined time period from the electromechanical transducers to a processing means and processing the signal for a plurality of time increments of the predetermined time period to determine a signal value of a signal parameter associated with the signal for each of the plurality of time increments. The method further comprises determining a reference value for the signal by measuring the signal value of the signal parameter associated with the signal for a beginning portion of the predetermined time period. The method further comprises after a beginning portion of the predetermined time period, determining, using the processing means, if a change measured relative to the reference value of the signal between a time increment and a consecutive time increment during the predetermined time period exceeds a threshold. The method further comprises indicating, by at least one of (i) the light emitting element, (ii) the graphical display and (iii) the audio disseminator, a representation of a bubble or a cloud of bubbles each instance the threshold measured change occurs during the predetermined time period. The method further comprises displaying, on the graphical display, a second graphical representation of having no bubbles for each of the plurality of time increments where the processor determines the threshold measured change does not occur. The graphical representation and the second graphical representation are displayed graphically as they are determined in a streaming fashion. The electromechanical transducers are acoustically coupled to the conduit. The electromechanical transducers, processor, and display are in electrical communication. The method is performed using a portable detector. Data associated with the signal is stored in a connected database. The representation of each bubble or a cloud of bubbles comprises a light flashing on at least one of the graphical display and the light emitting element. The representation of each bubble or a cloud of bubbles comprises at least one audio element emitted by audio disseminator for each bubble or a cloud of bubbles detected.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIG. 4 is a front view of the system for testing inhomogeneities in a fluid within a conduit and exhibiting by at least one of a light emitting element, a graphical display and an audio disseminator any inhomogeneities within the fluid, according to an example embodiment.

FIG. 5 is a block diagram of a system including a computing device and other computing devices, according to an exemplary embodiment of present technology.

DETAILED DESCRIPTION

Figure 1:
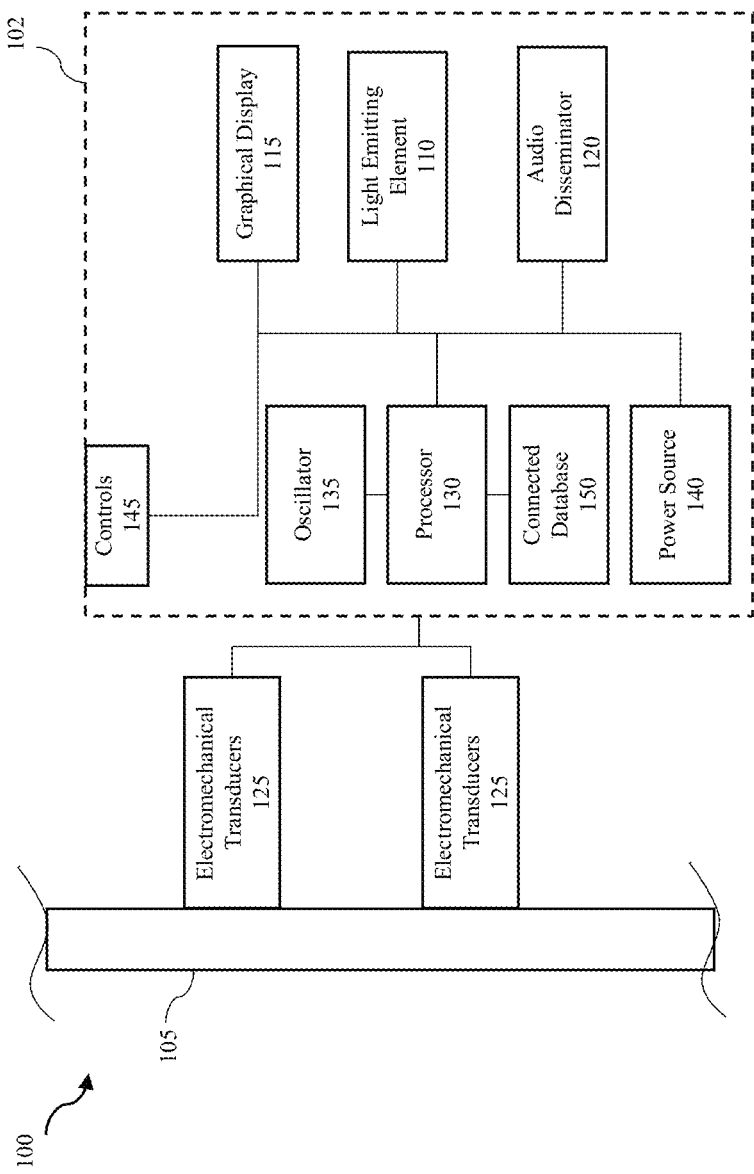
FIG. 1 is a diagram illustrating the main electrical components of the system for testing inhomogeneities in a fluid within a conduit and exhibiting by at least one of a light emitting element, a graphical display and an audio disseminator any inhomogeneities within the fluid, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system that accurately detects inhomogeneities in a fluid and provides real-time feedback. The present invention uses a preprogrammed algorithm to accurately and quickly determine whether a modulated signal produced by the electromechanical transducers indicates an inhomogeneity or not. In particular, detection accuracy and resolution are improved by automatically compensating for the variation in the level of the amplitude modulation elicited by the electromechanical transducers. This improves over the prior art by helping the user troubleshoot refrigerant cooling systems more accurately and efficiently for preventative maintenance and servicing problems.

The disclosed embodiments improve upon the problems with the prior art by providing a system capable of automatically setting and utilizing a distinctive reference value based on the level of the amplitude modulation from the electromechanical transducers elicited during initial startup period of the cooling system. Levels of the amplitude modulation from the transducers vary when monitoring different types of cooling system as different cooling systems operate under different conditions and consist of distinct components. By automatically setting a tailored reference value that reflects the specific operational parameters and component characteristics of each cooling system, the disclosed system enhances its ability to detect bubbles accurately thereby ensuring accurate and reliable bubble detection across various cooling systems types. For example, a window air conditioner may be assigned a different reference value due to its use of a different type of coolant, smaller coolant volume and lower pressure system compared to a vehicle's cooling system, which may operate at higher pressures and temperatures. Subsequently, the system determines a threshold value based on the set reference value, thereby significantly improving the detection level for inhomogeneities, such as vapor bubbles or coolant inconsistencies. This adjustment allows for an improvement of the overall efficiency and reliability of the cooling system and also prevents potential damage or inefficiency caused by undetected inhomogeneities.

The disclosed embodiments improve upon the problems with the prior art by providing a system when considering multiple factors when monitoring a cooling system, such as placement of the transducers, the size and thickness of the conduit tubing, and the different types of components and coolant fluids used in the cooling system, factors that can influence the level of the amplitude modulation from the electromechanical transducers and necessitate setting a specific reference value. Consideration and adjusting for these factors lead to enhanced accuracy in monitoring and diagnostics. Additionally, the automatic adaptability of the system to various cooling system configurations ensures versatile application across different types of cooling systems, further enhancing utility and effectiveness of the system.

The disclosed systems improve upon the prior art by providing a system that is calibrated during an early initial startup phase of the cooling system, when vapor or bubbles are always present in the fluid. The calibration of the detection system during the initial presence of bubbles provides a quick and accurate measurement of the reference signal for bubble detection, facilitating setting of a reference value tailored for the cooling system from the beginning. Such approach facilitates easy and quick calibration of the system for detecting inhomogeneities in the fluid of the conduit of the cooling system. The disclosed embodiments improve upon the prior art by providing methods and systems that are capable of calibrating the system for detecting previously undetectable bubbles but also automatically limits the sensitivity level so that no detection occurs in systems operating normally within its acceptable tolerances, significantly enhancing the accuracy of the detection. The enhanced calibration ensures greater adherence to safety and quality standards, and the ability to identify inconsistencies in the cooling system early in the detection phase enables quick and accurate preemptive maintenance actions, thereby minimizing potential malfunctions and costly production halts in cooling systems. Overall, these improvements strengthen compliance with rigorous industry regulations.

Further, the disclosed system improve upon the prior art by featuring an advanced display designed to continuously stream the detection of bubbles and the absence of bubbles in the fluid. This real-time visualization allows operators to easily and accurately interpret the status of bubble detection within the fluid, facilitating immediate assessment and responsive actions based on the visual data presented. Moreover, this advanced display helps in reducing operational errors by providing clear and instantaneous feedback, which is crucial for maintaining the efficiency and safety of the system. The visual clarity and dynamic updates enhance the operator's ability to make informed decisions swiftly, improving the overall system responsiveness. Additionally, the continuous streaming fashion of bubble detection data supports proactive maintenance practices, potentially extending the lifespan of the cooling system by allowing for timely adjustments and interventions.

Referring now to the Figures, FIG. 1 is a diagram illustrating the electrical communication between the components of the system 100 for testing inhomogeneities in a fluid within a conduit 105 and exhibiting by at least one of a light emitting element 110, a graphical display 115, and an audio disseminator 120 any inhomogeneities within the fluid, according to an example embodiment. In the present invention, the inhomogeneities may be bubbles inside the fluid in the conduit. The system 100 includes at least a pair of electromechanical transducers 125 coupled to the conduit. The electromechanical transducers are acoustically coupled to the conduit. Acoustically coupled means that the electromechanical transducers are clamped to the conduit. However, in other embodiments, other types of transducers may be used and are within the spirit and scope of the present invention. The electromechanical transducers, an oscillator circuit 135, a processor 130, or another means for processing the signal and the reference value, and the graphical display are in electrical communication. The system may also include a set of controls 145 configured to turn the components on or off and a connected database 150 configured to store data relating to the electrical signals sent by the electromechanical transducers.

The electromechanical transducers are configured to convert mechanical energy to electrical energy. In the present embodiment, the electromechanical transducers are ultrasonic transducers that receive ultrasonic waves from the fluid and covert the waves into electrical signals. In other embodiments, other types of electromechanical transducers configured to convert mechanical energy into electrical signals may be used and are within the spirit and scope of the present invention. The electrical signals are sent to the portable detector to be translated by the processor.

The processor, containing a microcontroller, can internally generate the oscillator circuit, simplifying the system by reducing external components. Specifically, the oscillator circuit generates the carrier signal oscillations that combine with the detection signal from the transducers to modulate the peak-to-peak amplitude of the signal, as depicted in FIG. 1B, enhancing the detection signal integrity before processing by the processor. In various embodiments, the oscillator circuit 135 comprises components such as an amplifier, a feedback network, and energy storage elements like capacitors or inductors. The amplifier boosts the incoming signal, while the feedback network, consisting of resistors, capacitors, or inductors, controls the frequency of the oscillation by managing the phase and gain conditions. Energy storage elements help maintain the oscillation by periodically storing and releasing energy. As the circuit powers on, the initial signal from the transducers is amplified and fed back into the input through the feedback network, building up to a stable oscillation. The frequency of this oscillation is determined by the feedback network components, allowing for precise control. This modulated signal is then transmitted to the processing means, which analyzes it to detect the presence and characteristics of bubbles in the conduit, ensuring high sensitivity and accuracy in monitoring inhomogeneities.

The light emitting element 110 may be any type of apparatus that is configured for emitting light and may include incandescent bulbs, halogen lights, fluorescent tubes, compact fluorescents, high intensity discharge lights, led light bulbs, LED panels, globe LED bulbs, diodes, or any combination of a device that is configured for emitting light. It is understood that other types of bulbs and light emitting devices may also be used and are within the spirit and scope of the present invention.

The housing 102 may be comprised of metallic material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™, other materials having waterproof type properties. The housing may be made of other materials and is within the spirit and the disclosure. The housing may be formed from a single piece or from several individual pieces joined or coupled together. The components of the housing may be manufactured from a variety of different processes including an extrusion process, a mold, casting, welding, shearing, punching, folding, 3D printing, CNC machining, etc. However, other types of processes may also be used and are within the spirit and scope of the present invention.

The system may also include a power source 140 that may be a battery power source. In the present embodiment, the battery power source may be a battery power source, such as a standard dry cell battery commonly used in low-drain portable electronic devices (i.e., AAA batteries, AA batteries, etc.). Other types of batteries may be used including rechargeable batteries, aluminum air batteries, lithium batteries, paper batteries, lithium-ion polymer batteries, lithium iron phosphate batteries, magnesium iron batteries etc. Additionally, other types of battery applications may be used and are within the spirit and scope of the present invention. For example, a rechargeable battery pack may also be used. Additionally, other types of power sources may also be used and are within the spirit and scope of the present invention. In other embodiments, the power source may be an external power source. For example, the system may include a power cable that can connect to an electrical wall outlet. Other types of external power sources may be used and are within the spirit and scope of the present invention.

Figure 1A:
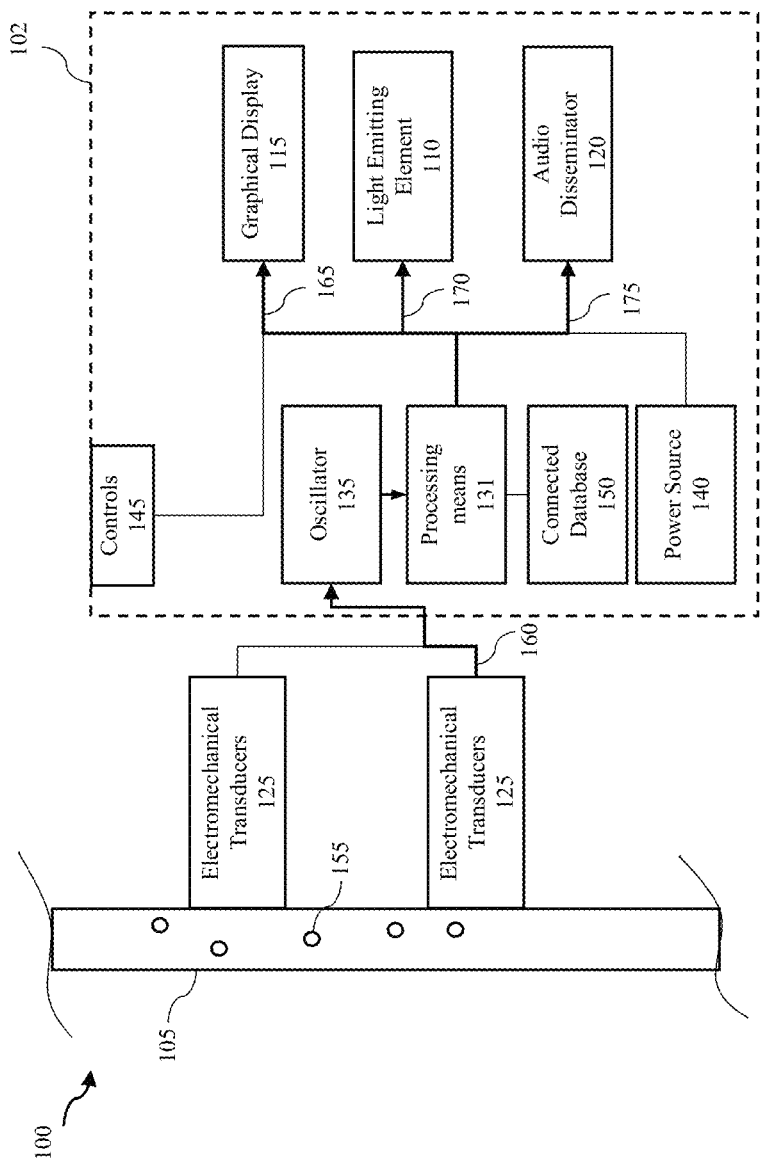
FIG. 1A illustrates an operation of a system for detecting inhomogeneities, according to an embodiment.
Figure 1B:
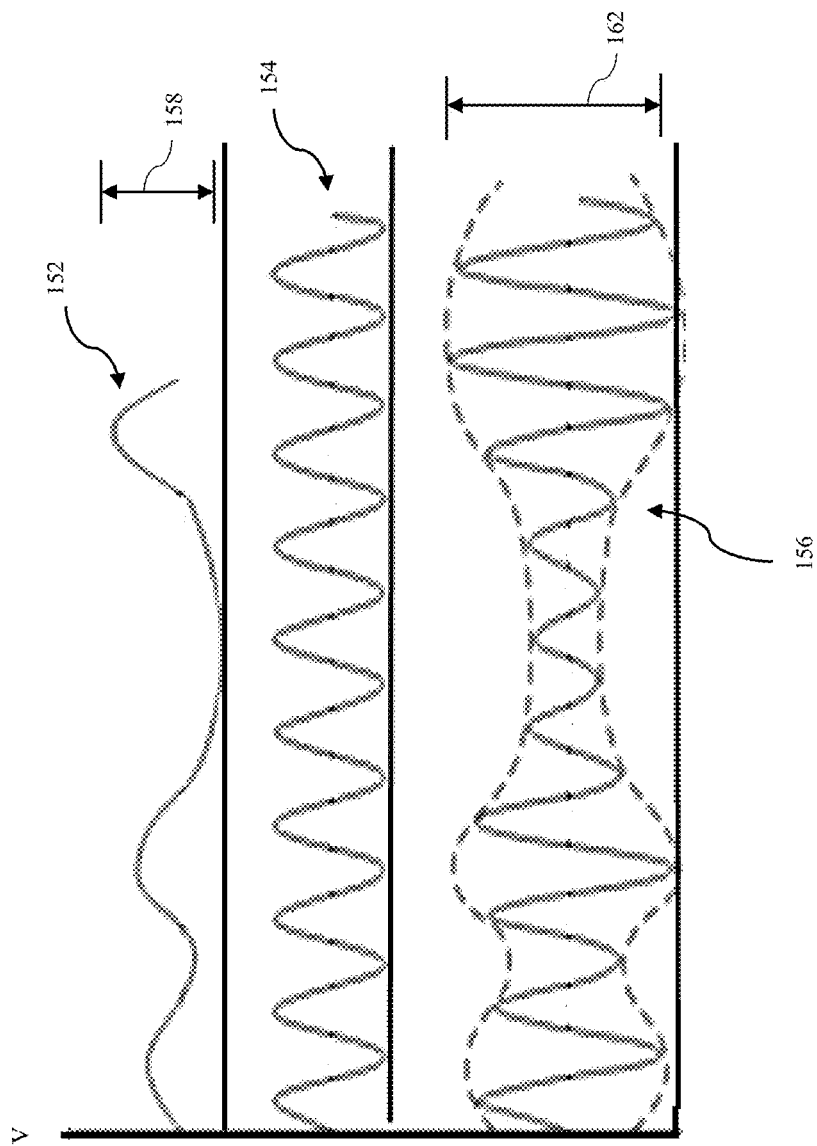
FIG. 1B illustrates signal waveforms derived from a fluid within a conduit, according to an embodiment.

FIG. 1A illustrates an operation of the system 100 for testing inhomogeneities in a fluid within a conduit 105 of the cooling system. In an example, the cooling system may comprise one of a Heating, Ventilation, and Air Conditioning (HVAC) systems, commonly used in residential and commercial buildings, to ensure air and cooling fluid. This includes specialized applications within air conditioning (AC) systems, such as window AC units, central air conditioning, and split systems. Additionally, the cooling system may include automotive cooling systems or Electric Vehicle cooling and heat pump systems, where maintaining the temperature of the Electric Vehicle's lithium-ion battery system constant is paramount for proper performance. Small household refrigerators and refrigerated vending machines or cooling towers and large-scale refrigeration units in industrial settings are other examples. In another example, the cooling system may include electronic cooling systems, such as those used in data centers or for high-performance computing equipment. Examples of the inhomogeneities include air bubbles, vapors, particulate matters such as dust, metal particles, or organic material that may enter the conduit, oil-water emulsions in systems where both oil and water are present, such as in certain cooling or heating systems.

As depicted in FIG. 1A, the invention comprises a conduit 105 integrated within a cooling system designed to facilitate the flow of fluid in a specified direction. This fluid may contain bubbles 155, dispersed throughout, moving in the direction of the fluid flow. The system has electromechanical transducers 125, which are acoustically coupled to the external surface of the conduit. Acoustic coupling refers to the transducers being attached in such a manner that they can detect vibrations or sound waves through the conduit material, allowing for precise monitoring of fluid characteristics. The transducers 125 are essential for sensing signals generated by the interaction between the fluid and any bubbles present. This detection process can be facilitated by a single transducer in some embodiments, while others may employ two transducers for enhanced accuracy. In setups with dual transducers, each transducer is positioned to maximize the capture of signal variations caused by bubble interactions, effectively improving the sensitivity and accuracy of the detection process. It should be noted that the figure illustrates bubbles of uniform size. In other embodiments of the invention, the bubbles may vary in size from physically tiny bubbles to clouds of tiny bubbles, to large bubbles, all of which the system is capable of detecting.

In the disclosed system for detecting inhomogeneities in the fluid, the system utilizes a carrier signal 154 generated by an oscillator circuit 135 and a detected signal 152 generated by the transducers, as shown in FIG. 1B. The detected signal 152 has the peak-to-peak amplitude value 158 as shown in the figure. The carrier signal 154 is a continuous oscillation signal characterized by a predefined amplitude and frequency. The detected signal interacts with the fluid and detects inhomogeneities such as bubbles, providing information regarding the presence, size, or quantity of bubbles within the fluid. The modulated signal 156 represents a combination of the carrier and detected signals, specifically reflecting modulation of the oscillation's amplitude. This modulated signal is subsequently processed by a processing means, which computes a value of a signal parameter, including but not limited to, the amplitude value from the modulated signal and a reference value from the modulated signal. It is noted that for clarity and ease of reference throughout the disclosure of the invention, the detected signal is referred to as the signal, and the modulated signal is processed by the processing means for detecting bubbles in the fluid.

In the disclosed embodiments, both transducers function as integral components of an oscillation circuit that provides carrier signal for the system. In an example, the oscillation circuit is unable to oscillate in the absence of the transducers. The interaction between the transducers once a bubble passes through the conduit forms the basis for detecting anomalies within the system. Initially, the first transducer influences the oscillations in the signal by modulating their amplitude to a certain degree. Following this initial modulation, the second transducer further influences the amplitude of these oscillations. When the second transducer begins to recover from its modulation effect, the oscillation circuit detects this change and interprets it as the presence of a bubble based on the distinctive pattern of amplitude modulation observed. The use of two transducers in this configuration offers several advantages over potential systems that might use only a single transducer. Firstly, the dual transducer setup enhances the sensitivity and accuracy of detecting bubbles or other inhomogeneities within the conduit. This increased sensitivity is due to the cumulative modulation effects and feedback from both transducers, which provide a more robust and detectable change in the oscillation pattern. Additionally, this arrangement allows for a more reliable operation as it minimizes the risk of false positives and ensures that only significant deviations in the amplitude, indicative of actual bubbles, trigger the detection mechanism. The utilization of two transducers optimizes the detection process and enhances the overall reliability and functionality of the cooling system.

Referring to FIG. 1B, once the signal is detected, it is transmitted through a conduit signal line 160 to a processing means 131 via the oscillator circuit 135. The term "signal line" refers to a direct, dedicated path for signal communication to the processing means, which is responsible for analyzing these signals. In various embodiments, the system designed for bubble detection, various types of processing means may be utilized to analyze the data from the transducers, each suited to different system requirements. The processing means may include a microprocessor for executing complex algorithms that assess the presence, size, and quantity of bubbles based on received modulated signals. For faster processing needs, a Digital Signal Processor (DSP) may be used, especially in applications requiring quick and efficient handling of complex signal processing tasks. In scenarios demanding real-time processing and high throughput, such as in large-scale industrial fluid systems, a Field-Programmable Gate Array (FPGA) may be used as the processing means. Alternatively, in various other embodiments, an Application-Specific Integrated Circuit (ASIC) may be used for specific types of signal modulations, which can enhance both efficiency and accuracy. In other embodiments, where simpler or smaller-scale applications are required, a microcontroller may be used, integrating all necessary components on a single chip to offer a cost-effective and compact solution. Additionally, in certain embodiments a capacitor circuit could be employed without the need for a processor. The electromechanical transducers, the processing means, and the graphical display are in electrical communication.

The overall operation of the system is described in two phases, an initial calibration phase and a subsequent normal operation phase. In the calibration phase, the processing means evaluates and computes the reference value based on the peak to peak amplitude modulation of the signal during the beginning instances (e.g., approximately 10 seconds) of a predetermined time period. The predetermined time period may, for example, be 5 minutes, with the beginning instances comprising the first 10 seconds. In various other embodiments, different predetermined time periods may be used, for example, within a range of 2-20 minutes or 7-40 minutes. Additionally, the beginning time instances may range from approximately 5-15 seconds or approximately 10-30 seconds, depending on the time required to determine the signal value and the reference value for the cooling system. Upon successful calibration, the processor continues to receive and analyze modulated signals, comparing them against the reference value computed during the calibration phase. If the peak-to-peak value of a newly received modulated signal exceeds a predetermined threshold, it suggests a change in the fluid, likely due to bubble formation or vapor. The processor then triggers alerts through various output mechanisms. The processor may send signals or instructions via electrical conductors 165, 170, and 175 to the graphical display 115, a light-emitting element 110, and an audio disseminator 120, respectively. Each mechanism provides a different form of alert (visual, light-based, or auditory) whenever a threshold change is detected, facilitating immediate and clear communication of system status to operators.

In the calibration phase of the system, the transducers 125 are coupled to the conduit 105 and activated so that the transducer begins sending signals to the processor before the cooling system is powered on. During this early initial calibration phase, vapor or bubbles are most always present in the refrigerant before condensing into a liquid. It is important that the system is ready to receive signals from the transducers before turning on the cooling system so that the system can be calibrated for the type of cooling system and types of bubbles that may be present in that particular system. Thereafter, the cooling system is activated, and its cooling is set to maximum to engage the compressor. Detecting and computing the reference signal at this stage is straightforward and accurate, and can be accomplished within a short span of time.

Figure 2:
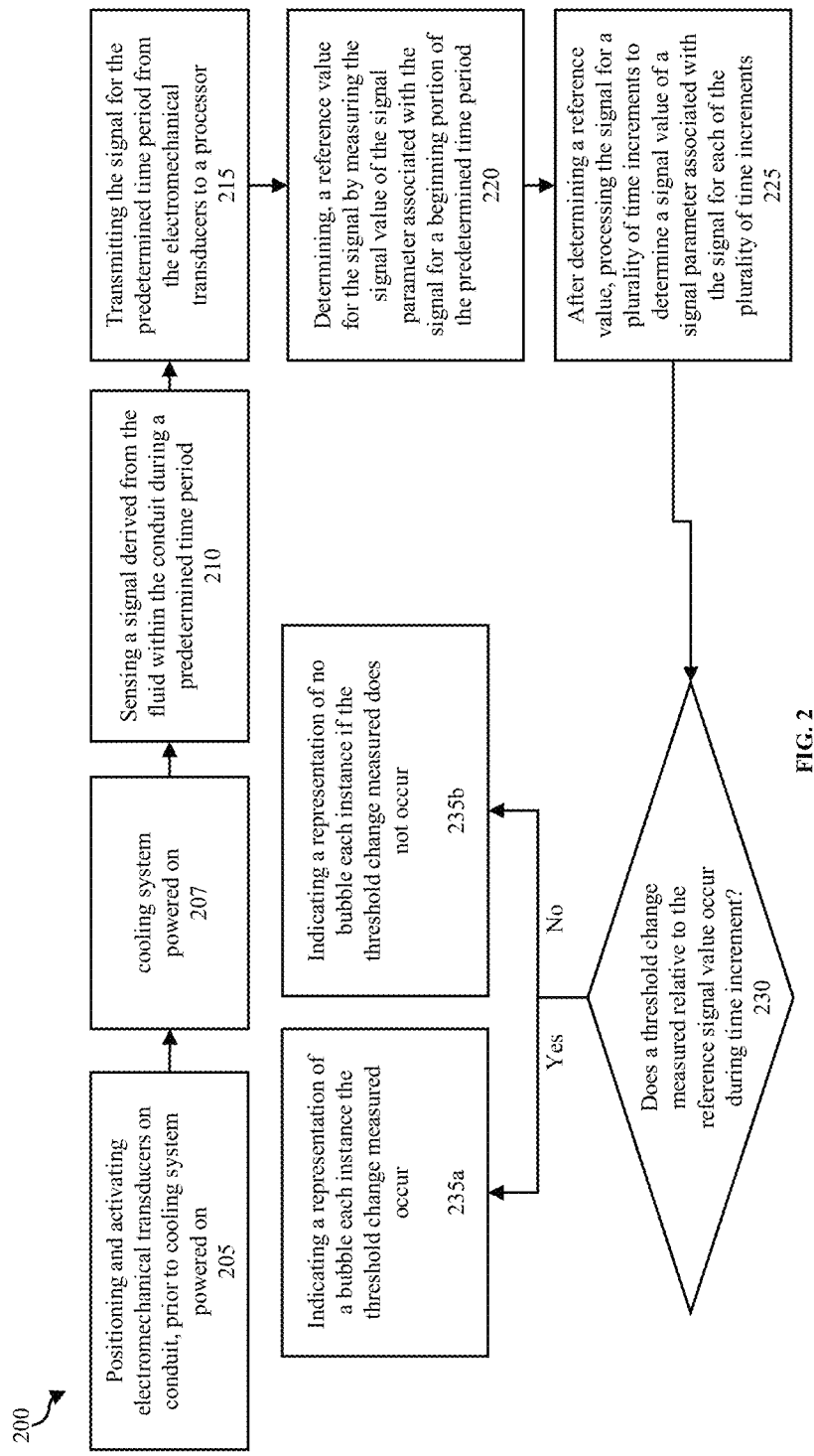
FIG. 2 is a flowchart diagram illustrating the steps for a method for testing inhomogeneities in a fluid within a conduit and exhibiting by at least one of a light emitting element, a graphical display and an audio disseminator any inhomogeneities within the fluid, according to an example embodiment.
Figure 2A:
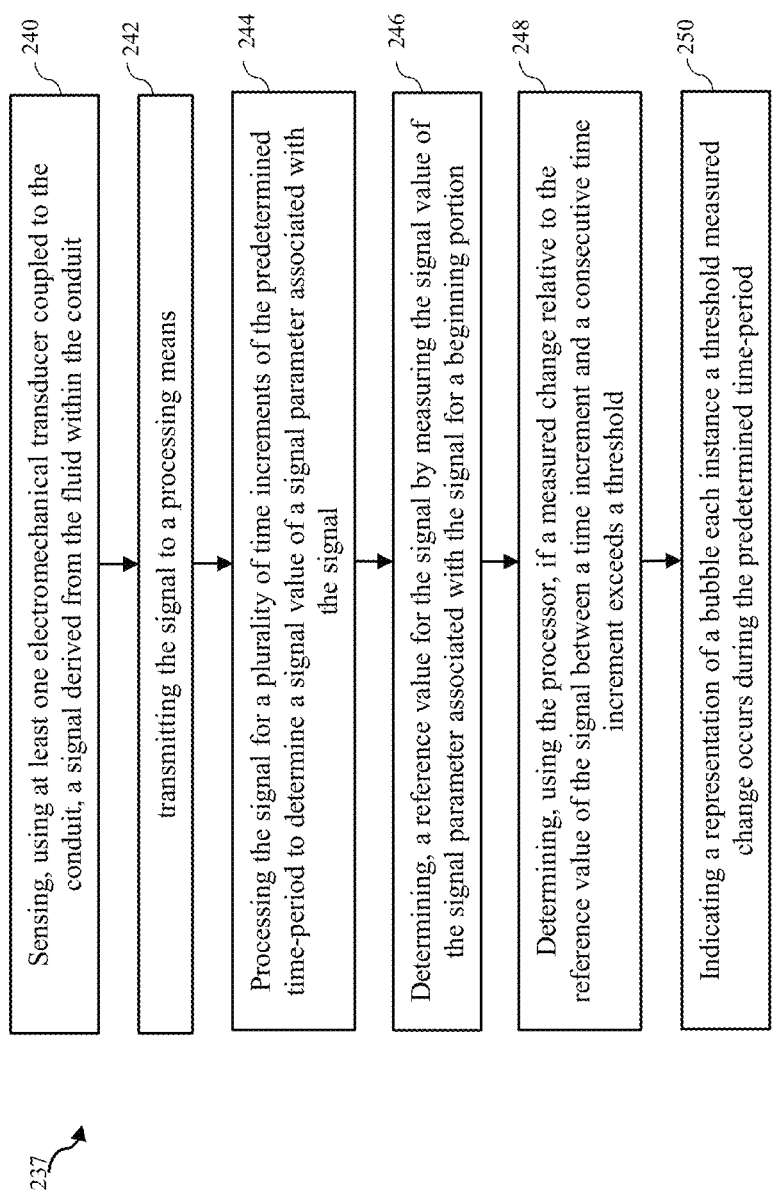
FIG. 2A illustrates a flow diagram of a method for indicating a representation of the bubbles present in a fluid, according to an embodiment.

Referring to FIG. 2A that illustrates a flow diagram of a method 237 for indicating a representation of the bubbles present in the fluid during this phase based on the reference signal. In step 240 of the disclosed method, the system senses a signal derived from the fluid within a conduit using at least one electromechanical transducer coupled to the conduit. This step is crucial as the quality and characteristics of the modulated signal directly influence the accuracy of bubble detection. The electromechanical transducer is responsible for converting the physical parameters, such as pressure or acoustic waves caused by bubbles in the fluid, into electrical signals that can be processed digitally. In step 242 the method involves transmitting the derived signal to the processing means. This transmission is vital for the timely and effective analysis of the data captured by the transducer. The integrity of this transmission process ensures that the signal remains accurate and uncorrupted, providing a reliable basis for further analysis. The processing means, equipped with a firmware, is then prepared to handle the incoming data for signal processing.

Figure 2B:
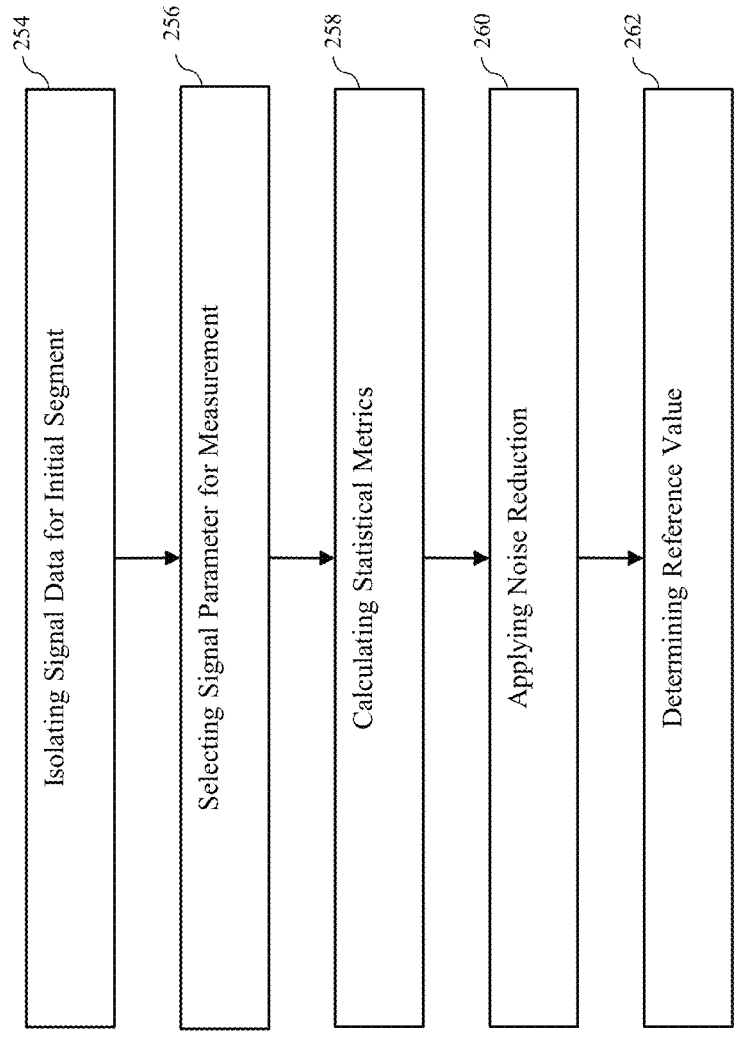
FIG. 2B illustrate method steps for processing and determining a reference value, according to an embodiment.

In step 244, the processing means processes the signal for a plurality of time increments during the predetermined time-period to determine a signal value of a signal parameter associated with the signal. This processing may involve filtering out noise, amplifying the signal, or extracting specific features indicative of bubbles. The processing means breaks down the time-period into multiple increments, allowing for a detailed time-based analysis to detect transient changes that could signify the presence of bubbles. Step 246 entails determining the reference value for the signal by measuring the signal value of the signal parameter associated with the signal for a beginning portion of the operation. Establishing this reference value is essential for comparative analysis, providing a baseline amplitude value against which future modulated signals are compared. This step is critical for calibrating the system to recognize normal conditions within the conduit, thereby enhancing the detection accuracy when deviations due to bubbles occur. In an embodiment, the flow diagram 253 as depicted in FIG. 2B provides method steps for processing and determining the reference value. In step 254, signal data is isolated for the beginning instances of the predetermined time period. In this step, the system isolates data from an initial segment corresponding to the beginning portion of the predetermined time period of the signal captured by the transducers. This segment typically represents an essential baseline or control sample, reflecting the state of the fluid or medium without interference or event occurrences. Isolating data from this initial segment allows for cleaner comparative analysis later, ensuring any changes or anomalies detected are not part of the baseline but are deviations indicative of specific events like bubble formation. In step 256, the signal parameter for measurement is selected. The system selects specific signal parameters that are most indicative of the phenomenon being monitored. These parameters might include amplitude, a peak-to-peak amplitude, a frequency, a period, a phase, a wavelength, a bandwidth, signal-to-noise ratio (SNR), modulation, and waveform that can provide insights into the characteristics of the fluid or the presence of inhomogeneities like bubbles. Selecting the right parameter is crucial as it directly influences the sensitivity and specificity of the anomaly detection process. In step 258, statistical metrics are calculated. The system computes various statistical metrics based on the selected signal parameter. This step involves detailed mathematical processing to derive metrics such as mean, standard deviation, variance, or more complex statistical indicators like skewness or kurtosis. These metrics are crucial for understanding the normal behavior of the signal and for setting thresholds that help identify significant deviations, which could be indicative of issues such as bubble presence.

Figure 1C:
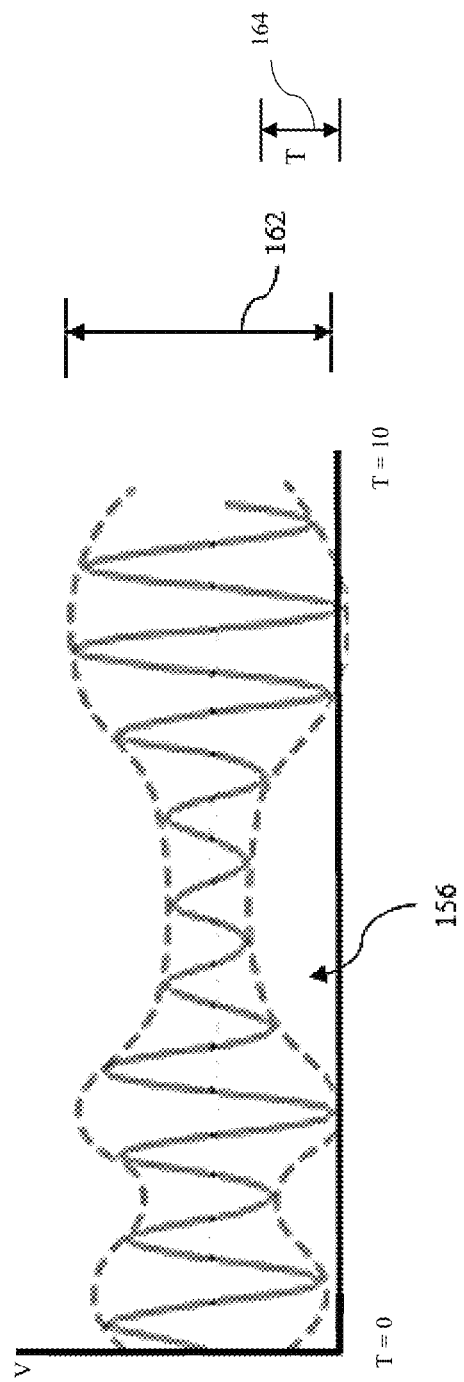
FIG. 1C depicts a modulated signal for determining a reference value, according to an embodiment.

In step 260, noise reduction is applied and in step 262, the reference value is determined. Noise reduction techniques, such as filtering or smoothing algorithms, are applied to the statistical metrics to eliminate background noise and enhance the signal quality. This clean, processed signal allows for a more accurate determination of the reference value in step 262. The reference value serves as a benchmark for future comparisons and is essential for continuous monitoring and detection systems. It ensures that only meaningful changes in the modulated signal are considered, minimizing false positives and enhancing the reliability of the detection system. Each of these steps is interlinked, creating a robust method for monitoring and analyzing signals for enhanced operational insights and decision-making. In an embodiment, the reference value is computed based on maximum peak-to-peak value of amplitude 162 as shown in FIG. 1C. For instance, the reference value is the maximum peak-to-peak value of amplitude 162 of the modulated signal 156. FIG. 1C illustrates a waveform representing the voltage value of a modulated signal over a short duration, specifically mapping the initial segment of a calibration phase. The x-axis is indicative of time, marked from T=0 to T=10 seconds, representing the beginning portion of the predetermined time period during the calibration process. This initial 10-second window establishes the baseline conditions for further analysis. The y-axis, measures the voltage levels of the modulated signal, effectively capturing fluctuations that may be indicative of underlying phenomena within the system being calibrated. The reference value determined during the calibration phase is stored in the system's memory or database. This stored reference value is subsequently used to compare and analyze signals derived from the fluid within the conduit during the normal operation phase.

Referring to FIG. 2A, after the reference signal is computed, in step 248 the method involves determining, using the processing means, if a measured change relative to the reference value of the signal occurs between a time increment and a consecutive time increment exceeds a threshold. The threshold value is defined as a predefined percentage of the reference value, used to determine the presence of inhomogeneities in the fluid based on signals derived during normal operation. For example, the peak-to-peak amplitude value of the signal from the fluid is compared against the stored reference value to ascertain if it meets or exceeds the threshold. In one embodiment, this threshold is set at 15%, providing a quantitative basis for analysis. The threshold value can vary depending on the specific characteristics of the reference signal within the cooling system. For instance, a higher reference value might necessitate a correspondingly higher threshold, whereas a lower reference value might only require a lower threshold. This flexibility in setting the threshold values allows for more accurate detection and responsiveness to changes in the system's operating conditions. In various embodiments, the range of the threshold values can be adjusted to suit different system requirements and sensitivities. These ranges might include, but are not limited to, 8-14%, 13-17%, or 18-20%. Such variations ensure that the system can maintain optimal performance across a variety of conditions and operational contexts, adapting to the specific dynamics and properties of the fluid within the cooling system.

Figure 1D:
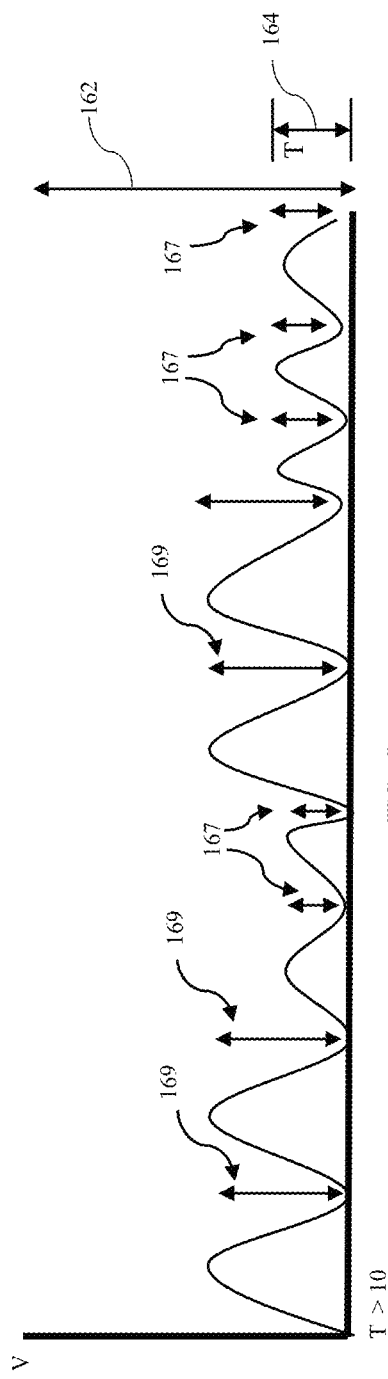
FIG. 1D is a detection signal derived from a fluid within a conduit of a cooling system, according to an embodiment.

The diagram depicted in FIG. 1D illustrates the detection of modulated signals during the normal operation phase, following the calibration phase of the system (shown in FIG. 1C according to one example embodiment as explained above). The x-axis represents time, specifically instances T>10 seconds, which correspond to the period following the initial 10-second segment within the predetermined time period used for calibration. The y-axis measures the voltage levels of the signals received from the fluid within the conduit. The graph displays the voltage fluctuations over time, clearly showing segments characterized by high and low crests having peak-to-peak amplitude values 167 and 169. These fluctuations represent the dynamic changes in the signal's amplitude as the system operates under normal conditions, capturing data essential for identifying the presence of anomalies like bubbles. In FIG. 1D, the threshold (T) 164 and is set at about 15% of the reference value (indicated as 162), established during the calibration phase. The processing means evaluates the peak-to-peak amplitude values of the signal and compares them to this threshold. Segments of the signal where the peak-to-peak amplitude exceeds the threshold (T) 164, such as signals having peak-to-peak amplitude values 169 are identified as indicating the presence of bubbles. Conversely, segments where the peak-to-peak amplitude value 167 remains below the threshold are identified as having no bubbles. This method allows for a clear distinction between normal and anomalous conditions within the fluid, enabling precise monitoring and intervention based on the detected signal characteristics.

Figure 1E:
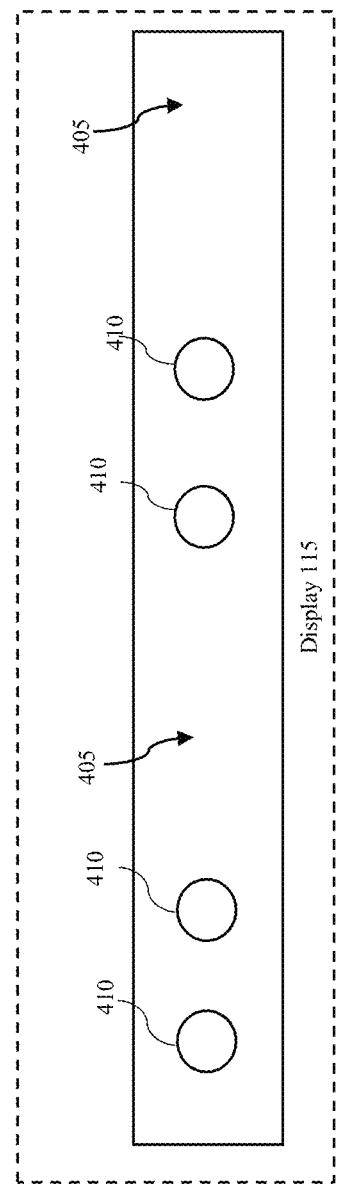
FIG. 1E illustrates a graphical display of a system to provide a real-time display of a detection status of inhomogeneities, according to an embodiment.

Referring to FIG. 2A, in step 250, a representation of a bubble is indicated for each instance a threshold measured change occurs during the predetermined time-period. This detection is based on comparing successive measurements to identify significant changes that surpass the threshold, indicative of bubbles. This continuous monitoring and dynamic response the system provides real-time alerts and data regarding the state of the fluid, allowing for immediate corrective actions. FIG. 1E illustrates the graphical display 115 of the system, designed to provide a real-time display of the detection status of inhomogeneities, such as bubbles, in a streaming fashion. This graphical user interface is crucial for immediate visualization and monitoring, facilitating quick response and management of the monitored system. In this display, every segment of the modulated signal that exceeds the predetermined threshold and is detected as containing bubbles is represented by a circular graphical symbol 410 This symbol serves as a clear indicator of the presence of bubbles within the fluid. Conversely, portions of the signal that remain below the threshold and are not indicative of bubble presence or considered to be within the cooling system's normal operating tolerances, are represented as empty spaces 405 within the graphical display. The display panel continuously updates these representations, allowing users to engage in real-time monitoring and display of bubble detection. This setup is instrumental in environments where maintaining the integrity and consistency of the fluid is critical, such as in manufacturing or processing plants. In some instances, there may be a slight delay between the actual detection of bubbles based on the signal and the display of this status on the graphical display 115. Such delays can be attributed to operational or processing latencies within the system. Nonetheless, the graphical display remains a vital tool for ensuring effective oversight and control of the system's performance in detecting bubbles and other inhomogeneities.

Figure 4A:
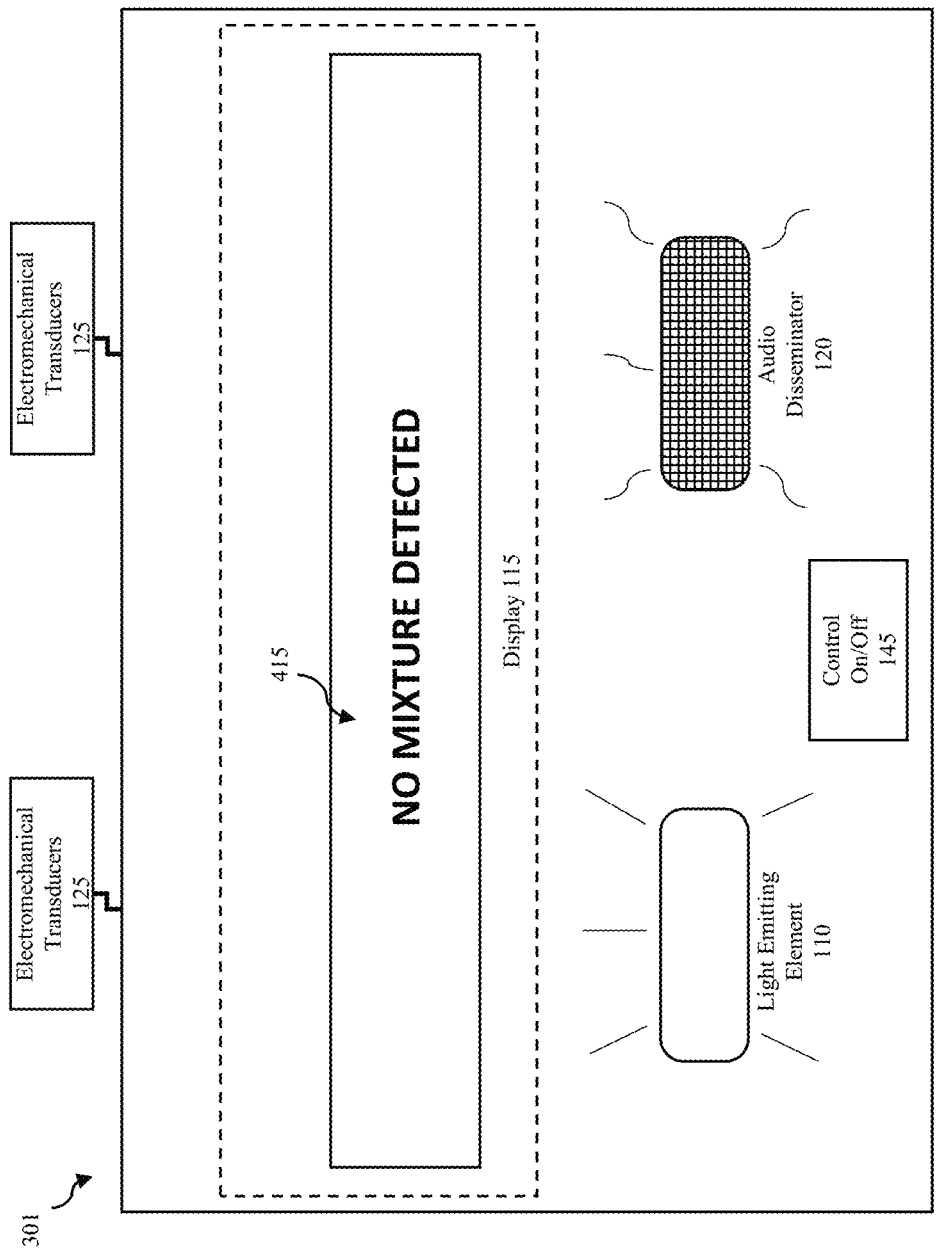
FIG. 4A is a front view of the system for testing inhomogeneities in a fluid within a conduit and exhibiting by at least one of a light emitting element, a graphical display and an audio disseminator any inhomogeneities within the fluid, according to another embodiment.

Additionally, the graphical display may be used to show text messages related to the status of bubble detection within the fluid. For instance, as depicted in FIG. 4A, the display may present the text message 415 as "NO MIXTURE DETECTED" to indicate a homogeneous state of the fluid, signifying that it is either entirely gaseous or liquid without any presence of vapor or bubbles. In other embodiments, different text messages such as "LIQUID/GAS MIXTURE DETECTED" appear when bubbles are identified in the liquid within the conduit. This feature enhances the user's ability to quickly understand the current state of the fluid's consistency and composition. In another embodiment, the text messages displayed on the graphical display 115 may also indicate low refrigerant levels, prompting further investigation for potential leaks or system malfunctions. The graphical display 115 can also employ colored messages to visually convey the extent of bubble detection. For example, a small quantity of bubbles may trigger a yellow-colored text message, signaling caution but not immediate concern, whereas a larger quantity of bubbles would prompt a red-colored text message, indicating a more serious condition that might require immediate attention. Additionally, the display can provide important operational alerts such as "COMPRESSOR NOT DETECTED". REPLACE BATTERIES" message appears when the battery voltage falls too low for the circuit to function correctly, advising the user to replace the 6 AA Alkaline batteries before resuming tests. Battery life is estimated at approximately 10 to 20 hours of continuous use, ensuring substantial operational time before the need for replacement arises.

Figure 2C:
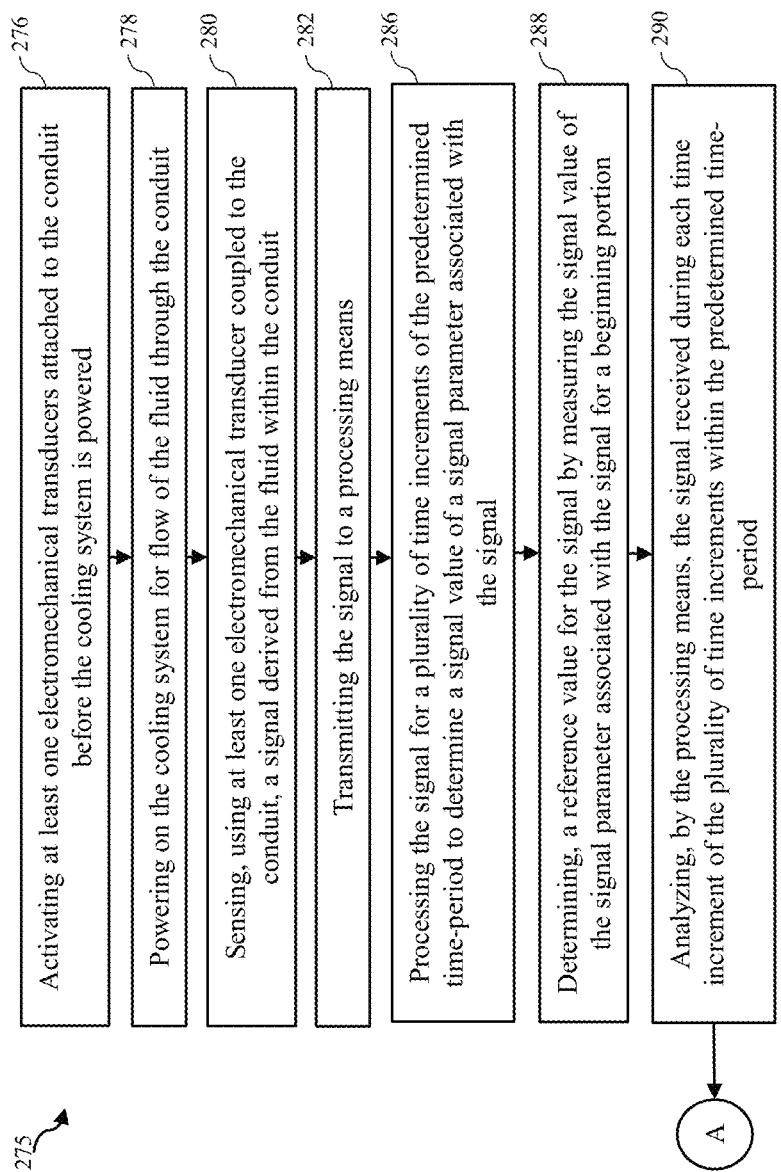
FIGS. 2C and 2D illustrate a flow diagram for a method of indicating a representation of bubbles in a fluid within a conduit, according to another embodiment.
Figure 2D:
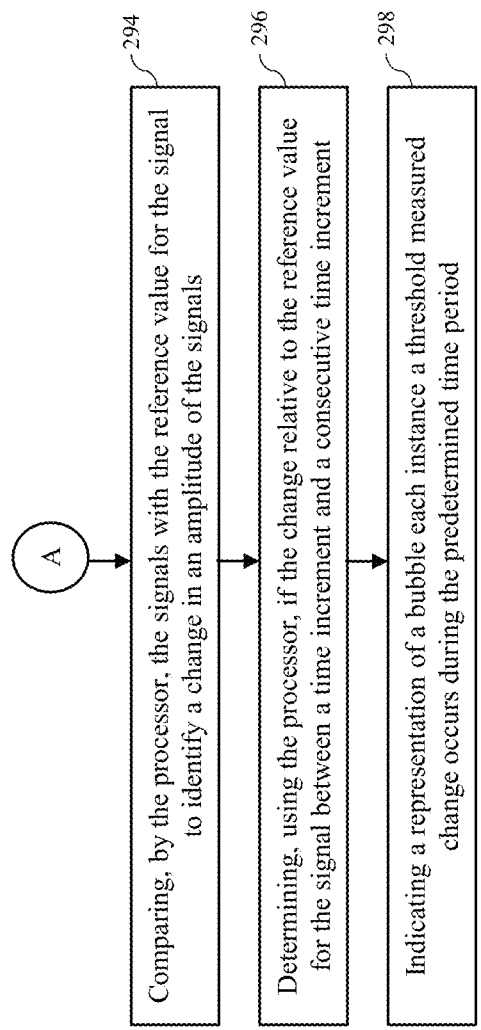
Figure 2E:
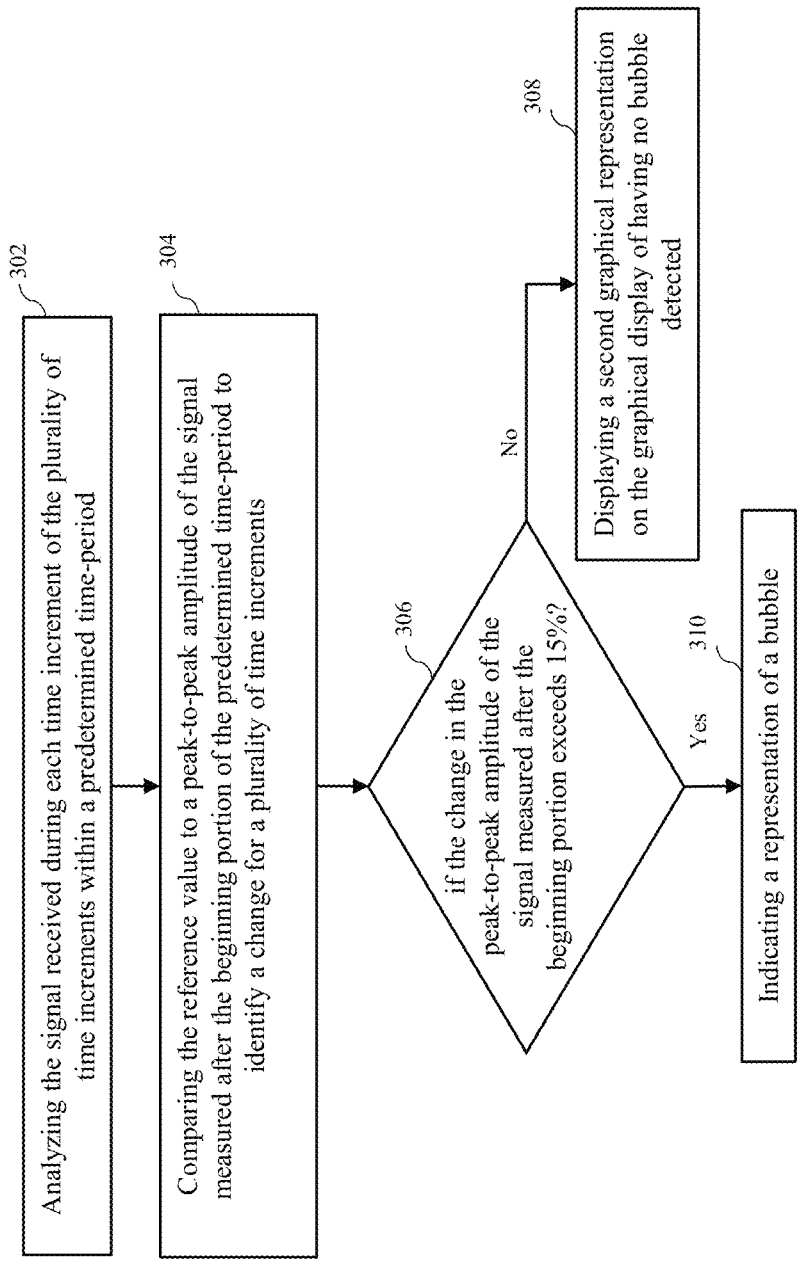
FIG. 2E depicts flow diagram of an algorithm for detecting presence of inhomogeneities in a fluid, according to an embodiment.

In an embodiment, the system utilizes an algorithm to detect the bubble in the fluid as shown in flow diagram of the method of FIG. 2E. The method initiates with step 302, where the signal received during each time increment within a predetermined time period is analyzed. This step involves breaking down the total observation period into smaller, manageable increments, enabling detailed analysis of the signal's characteristics over time. Next, in step 304, the reference value is compared to the peak-to-peak amplitude of the signal measured after the initial portion of the predetermined time period. This comparison is aimed at identifying any significant changes in the signal amplitude across multiple consecutive time increments. The purpose is to detect variations that may indicate the presence of inhomogeneities such as bubbles within the conduit. Step 306 further refines the analysis by determining if the change in the peak-to-peak amplitude of the signal measured after the beginning portion exceeds a predefined threshold of 15%. This threshold serves as a quantitative marker to distinguish between normal fluctuations and potential anomalies indicative of bubble formation. If the threshold is not exceeded, as outlined in step 308, the system proceeds to display a second graphical representation on the graphical display indicating no bubble detection. The second graphical representation of having no bubble detected for each of the plurality of consecutive time increments where the processing means determines the threshold change measured does not occur. This display reassures the operator of the normal operating conditions within the system. Conversely, if the change in the peak-to-peak amplitude does exceed the 15% threshold, as detailed in step 310, the system indicates the presence of a bubble. This is visually represented on the graphical display, alerting the operator to the potential issue within the fluid system, thus facilitating immediate attention and corrective action, as necessary. This method flow ensures accurate monitoring and responsiveness in real-time operations, enhancing system reliability and operational efficiency.

FIG. 2 is a flowchart diagram illustrating the steps for a method 200 for testing inhomogeneities in a fluid within a conduit and exhibiting by at least one of a light emitting element, a graphical display, and an audio disseminator any inhomogeneities within the fluid, according to an example embodiment. The method is performed using a portable detector. The method begins with step 205, wherein the user of the system positions the electromechanical transducers on the conduct such that the electromechanical transducers are clamped to the conduit. In step 207, the cooling system is powered on.

In step 210, the system 100 senses, using a pair of electromechanical transducers coupled to the conduit, a signal derived from the fluid within the conduit during a predetermined time period. The signal derived from the fluid may be electrical energy that is generated by the stimulation of the piezoelectric crystals in the electromechanical transducers. In step 215, the system transmits the signal for the predetermined time period from the electromechanical transducers to a processor, or another means for processing the signal. Data associated with the signal is stored in the connected database (150 in FIG. 1). In other embodiments, data captured with the processor could be held in memory with a capacitor circuit without the use of a microprocessor. Additionally, in certain embodiments the capacitor circuit may capture and retain the reference value without the need for a processor.

In step 220, the system determines a reference value for the signal by measuring the signal value of the signal parameter associated with the signal for a beginning portion of the predetermined time period. The beginning portion of the predetermined time period may be when the predetermined time period starts and continues for a certain amount of time. The signal parameter may include amplitude, peak to peak amplitude, frequency, period, phase, wavelength, bandwidth, signal-to-noise ratio (SNR), modulation, and waveform. The signal value of the signal parameter is the measured value of the signal parameter. The amplitude of a signal refers to its maximum value or strength, which is the highest point of a waveform. Peak-to-peak amplitude is a measure of the signal's strength that represents the difference between the maximum (peak) value and the minimum (trough) value of a waveform. In other words, it is the total range of the waveform from its highest point to its lowest point. Frequency, measured in Hertz (Hz), describes the number of cycles a signal completes within a unit of time, while the period is the duration of one complete cycle, usually measured in seconds. The phase of a signal represents its position relative to a reference point in time and is typically measured in degrees or radians. Wavelength is the distance between two consecutive points with the same phase in a waveform, often measured in meters. Bandwidth encompasses the range of frequencies occupied by a signal, and in communication systems, it relates to the width of the frequency band needed for signal transmission without significant distortion or loss of information. The signal-to-noise ratio (SNR) is an indicator of signal quality, as it measures the ratio of the power of the desired signal to the power of background noise. A higher SNR denotes a cleaner and less noisy signal. Modulation is the process of altering one or more properties, such as amplitude, frequency, or phase, of a carrier signal according to another signal, which typically contains information to be transmitted. Lastly, the waveform is the shape of the signal as a function of time and can take various forms, such as sinusoidal, square, triangular, or sawtooth. These parameters play a crucial role in the analysis, processing, and transmission of signals sent by the transducers to the processor.

In step 225, the system processes, using the processor or another means for processing the signal, the signal for a plurality of time increments of the predetermined time period to determine a signal value of a signal parameter associated with the signal for each of the plurality of time increments.

In step 230, subsequent to determining the reference value, the system determines, using the processor and a preprogrammed algorithm, or another means for processing the reference value, if a threshold measured change relative to the reference value occurs between a time increment and a consecutive time increment during the predetermined time period. The threshold measured change occurs when the difference between a signal's parameter value and the reference value exceeds a predetermined threshold. The preprogrammed algorithm is configured to accurately detect if the signal value is outside of the threshold measured change relative to the reference value. If the threshold measured change relative to the reference value does occur for a time increment, then, in step 235*a*, the system indicates, by at least one of the light emitting element, the graphical display, and the audio disseminator, a representation of a bubble or a cloud of bubbles each instance the threshold measured change occurs during the predetermined time period. The representation of a bubble or a cloud of bubbles may be the graphical representation on the graphical display, a flashing light from the light emitting element, and a sound being emitted from the audio disseminator. In an example, the representation of each bubble comprises at least one audio element emitted by the audio disseminator for each bubble detected. A cloud of bubbles may be a plurality of bubbles that may be detected as either a single bubble or multiple bubbles. The cloud of bubbles may also be a plurality of adjoined bubbles that are substantially smaller than single bubbles. If threshold measured change relative to the reference value does not occur for a time increment, then, in step 235*b*, the system displays, on the graphical display, a second graphical representation of having no bubbles for each of the plurality of time increments, does not disseminate sound or does not emit light from the light emitting element. It is also understood that different lights and sounds may be used to display that the system has determined that no bubble has been detected.

FIGS. 2C and 2D illustrate another embodiment of a flow diagram for a method of indicating the representation of bubbles in the fluid within the conduit. The method 275 described in FIGS. 2C and 2D outlines a systematic approach for detecting bubbles in the fluid of a conduit, primarily in the cooling system. The method begins with step 276, where at least one electromechanical transducer is activated prior to powering the cooling system. This preparatory step ensures that the transducers are ready to immediately begin monitoring the fluid's behavior as soon as the system starts, enhancing the responsiveness and accuracy of data capture. In step 278, the cooling system is powered on to initiate the flow of fluid through the conduit. This activation is crucial as it sets the stage for real-time monitoring and detection of anomalies like bubbles that could affect the system's efficiency and operation. Following this, step 280 involves sensing the fluid within the conduit using the previously activated electromechanical transducers. These devices are crucial for detecting the acoustic or pressure changes caused by bubbles in the fluid, converting these physical changes into electrical signals for further analysis. Step 282 entails transmitting the signals obtained from the transducers to a processing means. This transmission is key to ensuring that the raw data is quickly and accurately relayed for immediate analysis, which takes place in step 286. Here, the processing means evaluates the signal for a plurality of time increments within a predetermined time period to determine the value of a specific signal parameter, such as amplitude or frequency, that relates to the presence of bubbles.

In FIG. 2D, step 288 involves determining a reference value for the signal by measuring the signal value of the signal parameter associated with the signal during an initial portion of the operation. This reference value serves as a baseline against which future signal variations are compared. Step 290 further analyzes the signal received during each time increment to ensure continuous monitoring. In step 294, the signals are compared with the reference value to identify any change in amplitude that might indicate the presence of bubbles. If a significant change is detected, as determined in step 296, the system assesses whether this change relative to the reference value exceeds a predefined threshold. Finally, step 298 involves indicating a representation of a bubble on the system's display each time a threshold-measured change is observed during the predetermined time period. This comprehensive method ensures that any presence of bubbles is accurately detected and promptly reported, allowing for timely corrective measures to maintain the cooling system's integrity and performance.

Figure 3:
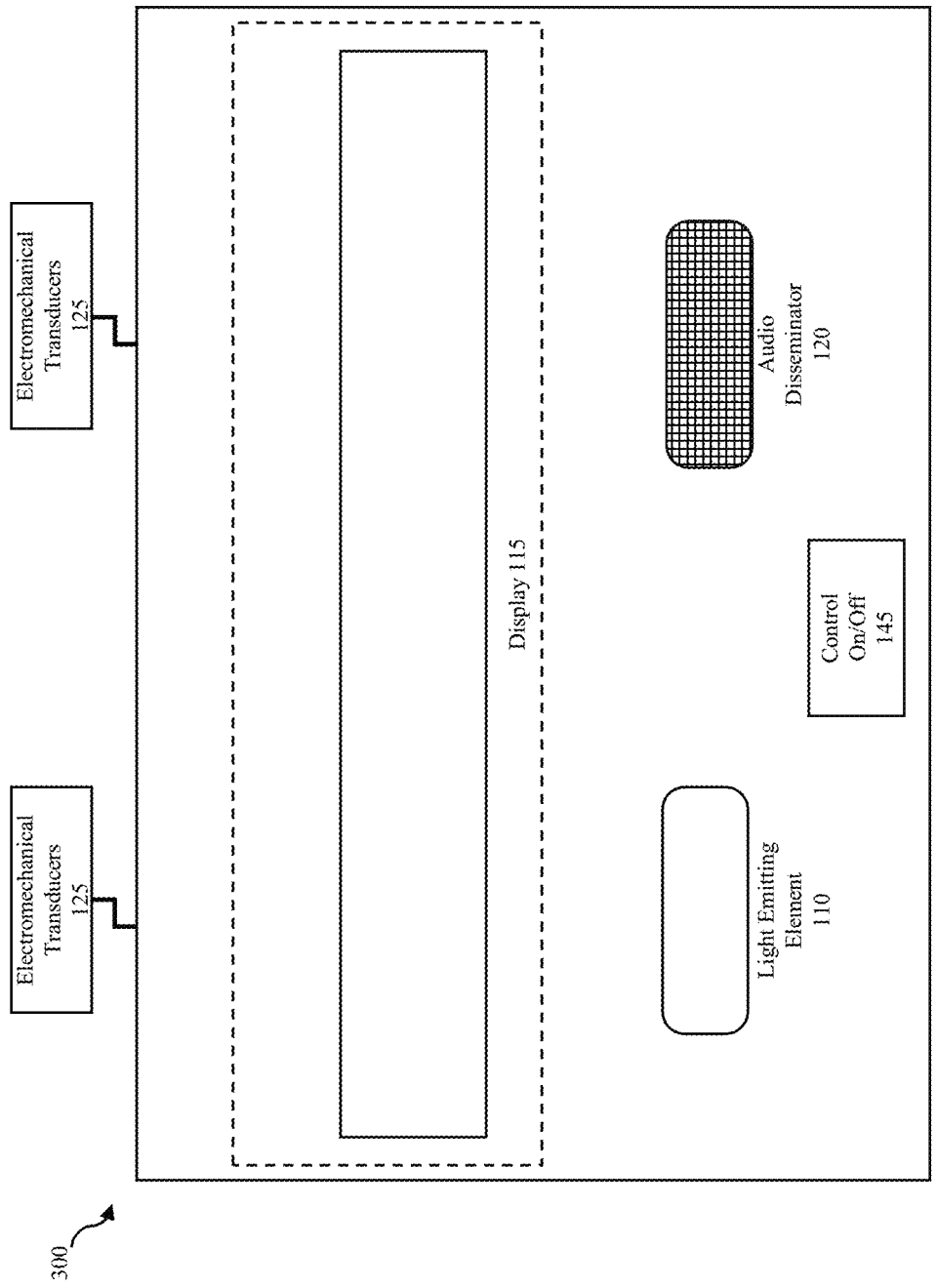
FIG. 3 is a front view of the system for testing inhomogeneities in a fluid within a conduit and exhibiting by at least one of a light emitting element, a graphical display and an audio disseminator any inhomogeneities within the fluid, according to an example embodiment.

Referring now to FIG. 3 and FIG. 4, front views of the portable detector for testing inhomogeneities in a fluid within a conduit and exhibiting by at least one of a light emitting element, a graphical display and an audio disseminator any inhomogeneities within the fluid are shown, according to example embodiments. The portable detector includes at least one of the graphical display 115, the light emitting element 110, the audio disseminator 120, the electromechanical transducers 125, and the controls 145. However, it is understood that any combination of the elements used to indicate that the system has detected the bubble or a cloud of bubbles may be used and are within the spirit and scope of the present invention.

FIG. 3 illustrates a portable detector 300 that is in the off configuration, in which the components are not operating. Therefore, the components are not emitting or disseminating signals or feedback. The controls 145 may be a button that turns the portable detector on or off. In some embodiments, the controls may control specific components, such as the graphical display, the audio disseminator, and/or the light emitting element, such that the user of the system may elect to only turn on one of the aforementioned components. This allows the system to exhibit the inhomogeneities via one or more of said components.

Shown in FIG. 4, the portable detector 301 is turned on and electromechanical transducers are coupled to the conduit. The graphical representation of empty spaces 405 and the second graphical representation or the circular graphical symbol 410 are displayed graphically on the graphical display 115 as they are determined by the system in a streaming fashion. After each consecutive time increment, the graphical display consecutively displays at least one of the graphical representation or the second graphical representation. Each graphical representation and second graphical representation represent feedback from the system between the time increments over the period of time. In other words, the system detects and displays bubbles in a streaming fashion in real time so that the user can easily detect bubbles that are occurring almost immediately after the system detects a bubble or a cloud of bubbles. If the portable device receives a signal that has a parameter value beyond the threshold measured change relative to the reference value for a time increment, then the portable device has detected a bubble or a cloud of bubbles. Therefore, for each time increment wherein the parameter value is beyond the threshold measured change relative to the reference value, then the portable device displays a graphical representation via the graphical display, flashes light via the light emitting element, or disseminates sound via the audio disseminator.

The graphical representation may be a circle or bubble to represent the presence of a bubble or a cloud of bubbles, or other icons configured to denote the presence of a bubble or a cloud of bubbles, such as but not limited to, a check mark, may be used and are within the spirit and scope of the present invention. In other embodiments, the graphical representation may be a bar graph that expands or contracts depending if the presence of bubbles increases or decreases. The representation of each bubble may also include a light flashing on either the graphical display and the light emitting element. The light emitting element may emit light at least once. The representation of each bubble further includes at least one audio element emitted by an audio disseminator for each bubble. The system determines that a bubble is present within the conduit for each time increment over the period of time. The audio element may be any sound or combination of sounds configured to alert a user of the system that a bubble or a cloud of bubbles is detected.

If the portable device determines that the modulated signal that does not have a parameter value beyond the threshold measured change relative to the reference value for a time increment, then the portable device has not detected a bubble or a cloud of bubbles. Therefore, the portable device may display a second graphical representation via the graphical display showing no bubble, may not emit light via the light emitting element, and may not disseminate sound via the audio disseminator. The second graphical representation may be a blank space to represent the absence of a bubble. In other embodiments, other icons configured to denote the absence of a bubble, such as but not limited to, an X sign, may be used and are within the spirit and scope of the present invention.

In an example embodiment, the system is designed to provide air conditioning service technicians with a real-time, non-invasive view inside refrigerant systems. Once its ultrasonic sensor transducers are clamped onto the refrigerant tubing, the system enables technicians to observe the internal state of the system without direct or invasive intervention. This capability is particularly useful as a troubleshooting tool, offering insights into system issues that are otherwise unidentifiable using traditional methods, including the use of an actual sight glass. The device is highly responsive, mirroring the behavior seen in traditional sight glasses, as it detects changes in the refrigerant's state from liquid to a liquid/gas mixture, to gas. This responsiveness is crucial for accurate monitoring and diagnostics. In terms of functionality, the system utilizes a graphical LCD display to show a cross-section of the tubing where animated circles, simulating bubbles, sweep horizontally across the screen. This visualization is akin to observing the refrigerant through an actual sight glass, but with enhanced clarity and without the need for direct optical access. The system is an essential tool for both preventive maintenance and the resolution of challenging service issues, optimizing refrigerant charge to maximize cooling efficiency and system performance. Its design includes a four-foot cord, operates on any metal tubing, and is built into a rugged ABS carrying case, making it both durable and portable for field operations. Furthermore, the system's technical specifications complement its advanced features, supporting a broad operational range with instant response times. It operates effectively on tubing diameters ranging from ⅛" to 1.25" and is powered by four to six AA alkaline batteries, providing approximately 10 to 20 hours of continuous use. The system includes a 1.8" color graphic LCD for clear, detailed displays of the system's status and measures a compact 2.12×7.00×9.5 inches, weighing only 1.6 lbs. This makes the system not only a powerful diagnostic tool but also a user-friendly device with practical applications in various environmental conditions.

In the example embodiment, the system provides automotive AC technicians with a novel, non-invasive method to assess and service refrigerant systems effectively. To utilize the system, the technician begins by attaching ultrasonic sensor transducers to the metal tubing of the AC system, ensuring the clamps are hand-tight and placed no more than a few inches apart. Once the transducers are securely mounted, the technician powers on the unit and then starts the engine, with the display instructions to turn on the AC, set the temperature and fan to maximum cooling, and leave the doors open to engage the compressor before pressing the power button again. This preparation allows the system to commence its analysis, displaying "PROCESSING" briefly before actively monitoring the refrigerant as it cycles through the system. The display indicates the presence of bubbles with circular symbols moving across the screen, providing a real-time, dynamic view of the refrigerant's condition. Operationally, the system is invaluable for detecting bubbles or gas in the refrigerant, essential for diagnosing issues like refrigerant contamination, incorrect refrigerant charge, or a defective AC system component. If bubbles are detected, the display differentiates between a small or large quantity of bubbles by showing specific messages as noted above. The system enhances diagnostic capabilities without the need for invasive procedures that could introduce contaminants into the system, thereby avoiding potential complications arising from conventional methods involving hoses and manifolds. Moreover, the system features adjustable sensitivity settings, allowing technicians to tailor the device's responsiveness to specific system conditions, with a default sensitivity threshold set at about 15% of the reference value set during the calibration phase. If the change measured is greater than about 15% of the reference value, the display exhibits that a bubble is present. Adjustments can be made in 5% increments to either increase or decrease sensitivity or threshold (of maximum peak to peak amplitude signal detected during the calibration phase or beginning part of the predetermined time period) based on the operational environment or specific testing needs. Once the unit is powered off, it reverts to the default sensitivity setting. This feature, combined with the ability to perform a variety of critical tests from checking for air in the system to diagnosing overcharged conditions or clogged filters positions the system as a crucial tool for both routine maintenance and complex troubleshooting tasks in modern A/C systems. The device's utility is underscored by its ability to reveal problems that are not detectable through traditional sight glasses, making it an indispensable tool in the transition to newer refrigerants and their moisture-sensitive lubricants.

Referring now to FIG. 5, a block diagram of a system including an example computing device 500 and other computing devices is shown, according to an exemplary embodiment of present technology. Consistent with the embodiments described herein, the aforementioned actions performed by the processor may be implemented in a computing device, such as the computing device 500 of FIG. 5. Any suitable combination of hardware, software, or firmware may be used to implement the computing device 500. The aforementioned system, device, and processors are examples and other systems, devices, and processors may comprise the aforementioned computing device. Furthermore, computing device 500 may comprise an operating environment for system 100 and method 200 and other described herein. Method 200 and other described herein may operate in other environments and are not limited to computing device 500.

With reference to FIG. 5, a system consistent with an embodiment of the invention may include a plurality of computing devices, such as computing device 500. In a basic configuration, computing device 500 may include at least one processing unit 502 and a system memory 504. In addition, computing device 500 may include at least one graphics processing unit (GPU) 503 to render images and videos quickly and efficiently. It accelerates graphics processing, offloads tasks from the processing unit 502, and enables real-time interactivity and high-quality visuals in applications. Depending on the configuration and type of computing device, system memory 504 may comprise, but is not limited to, volatile (e.g., random access memory (RAM)), non-volatile (e.g., read-only memory (ROM)), flash memory, or any combination or memory. System memory 504 may include operating system 505, and one or more programming modules 506. Operating system 505, for example, may be suitable for controlling computing device 500's operation. In one embodiment, programming modules 506 may include, for example, a program module 507 for executing the actions of the portable detector, for example. Furthermore, embodiments of the invention may be practiced in conjunction with a graphics library, other operating systems, or any other application program and is not limited to any particular application or system. This basic configuration is illustrated in FIG. 5 by those components within a dashed line 520.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a camera, a touch input device, etc. Output device(s) 514 such as a display, speakers, a printer, etc. may also be included. The aforementioned devices are only examples, and other devices may be added or substituted.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, Bluetooth® and other wireless media. The term computer readable media as used herein may include both computer storage media and communication media.

As stated above, a number of program modules and data files may be stored in system memory 504, including operating system 505. While executing on processing unit 502, programming modules 506 (e.g., program module 507) may perform processes including, for example, one or more of the stages of the methods 200 as described above. The aforementioned processes are examples, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable user electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. It is understood that, in certain embodiments, the functions/acts noted in the blocks may occur out of order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It should also be noted that additional information about the attached methods and systems is included in the appendix to this specification, the substance of which Application hereby incorporated by reference.

The invention claimed is:

1. A method for testing inhomogeneities in a fluid within a conduit of a cooling system and exhibiting by at least one of (i) a light emitting element, (ii) a graphical display and (iii) an audio disseminator any inhomogeneities within the fluid, the method comprising:
   sensing, using at least one electromechanical transducer coupled to the conduit, a signal derived from the fluid within the conduit;
   transmitting the signal, received for a predetermined time period, from the at least one electromechanical transducer to a processing means;
   processing, using the processing means, the signal for a plurality of time increments of the predetermined time period to determine a signal value of a signal parameter associated with the signal for each of the plurality of time increments;
   determining, a reference value for the signal by measuring the signal value of the signal parameter associated with the signal for a beginning portion of the predetermined time period;
   after a beginning portion of the predetermined time period, determining, using the processing means, if a change measured relative to the reference value of the signal between a time increment and a consecutive time increment during the predetermined time period exceeds a threshold; and
   indicating in a streaming fashion as they are determined, by at least one of (i) the light emitting element, (ii) the graphical display and (iii) the audio disseminator, a representation of a bubble each instance a threshold change measured occurs during the predetermined time period.

2. The method of claim 1, wherein further comprises displaying, on the graphical display, a second graphical representation of having no bubble detected for each of the plurality of time increments where the processing means determines the threshold change measured does not occur.

3. The method of claim 1, wherein the at least one electromechanical transducer is acoustically coupled to the conduit.

4. The method of claim 1, wherein the at least one electromechanical transducer, the processing means, and the graphical display are in electrical communication.

5. The method of claim 1, wherein the method is performed using a portable detector.

6. The method of claim 1, wherein the signal parameter of the signal comprises one of an amplitude, a peak to peak amplitude, a frequency, a period, a phase, a wavelength, a bandwidth, signal-to-noise ratio (SNR), modulation, and waveform.

7. The method of claim 1, wherein the representation of each bubble comprises a light flashing on at least one of the graphical display and the light emitting element.

8. The method of claim 1, wherein the representation of each bubble comprises at least one audio element emitted by the audio disseminator for each bubble detected.

9. A method for testing inhomogeneities in a fluid within a conduit of a cooling system and exhibiting by at least one of (i) a light emitting element, (ii) a graphical display and (iii) an audio disseminator any inhomogeneities within the fluid, the method comprising:
   activating at least one electromechanical transducer attached to the conduit before the cooling system is powered on;
   powering the cooling system for flow of the fluid through the conduit;
   sensing, using at least one electromechanical transducer coupled to the conduit, a signal derived from the fluid within the conduit;
   transmitting the signal, received for a predetermined time period, from the at least one electromechanical transducer to a processing means;
   processing, using the processing means, the signal for a plurality of time increments of the predetermined time period to determine a signal value of a signal parameter associated with the signal for each of the plurality of time increments, wherein the signal value is determined based on at least one parameter associated with the cooling system;
   determining, a reference value for the signal by measuring the signal value of the signal parameter associated with the signal for a beginning portion of the predetermined time period, wherein the reference value is derived from a maximum peak to peak amplitude measured during the beginning portion of the predetermined time period;
   after the beginning portion of the predetermined time period, analyzing, by the processing means, the signal received during each time increment of the plurality of time increments within the predetermined time period;
   comparing, by the processing means, the reference value to a peak to peak amplitude of the signal measured after the beginning portion of the predetermined time period so as to identify a change for the plurality of time increments;

determining, using the processing means, if the change in the peak to peak amplitude of the signal measured after the beginning portion of the predetermined time period exceeds a threshold; and indicating, by at least one of (i) the light emitting element, (ii) the graphical display and (iii) the audio disseminator, a representation of a bubble each instance the change during the predetermined time period exceeds the threshold.

10. The method of claim 9, wherein the at least one electromechanical transducer is acoustically coupled to the conduit.

11. The method of claim 10, wherein the at least one electromechanical transducer, the processing means, and display are in electrical communication.

12. The method of claim 11, wherein the threshold is about 15% of the reference value of the signal.

13. The method of claim 12, wherein if the change measured is greater than about 15% of the reference value, then exhibiting that a bubble is present.

14. The method of claim 13, wherein the representation of each bubble comprises a light flashing on at least one of the graphical display and the light emitting element.

15. The method of claim 14, wherein the representation of each bubble comprises at least one audio element emitted by the audio disseminator for each bubble detected.

16. The method of claim 15, wherein the beginning portion of the predetermined time period is approximately 10 seconds.

17. A system for testing inhomogeneities in a fluid within a conduit of a cooling system and exhibiting any inhomogeneities within the fluid in a streaming fashion by at least one of (i) a light emitting element, (ii) a graphical display and (iii) an audio disseminator, the system comprising:

a processing means;
at least one electromechanical transducer;
the light emitting element;
the graphical display; and
the audio disseminator;
wherein the system is configured for:
sensing, using the at least one electromechanical transducer coupled to the conduit, a signal derived from the fluid within the conduit;
transmitting the signal, received for a predetermined time period, from the at least one electromechanical transducer to the processing means;
processing, using the processing means, the signal for a plurality of time increments of the predetermined time period to determine a signal value of a signal parameter associated with the signal for each of the plurality of time increments;
determining, a reference value for the signal by measuring the signal value of the signal parameter associated with the signal for a beginning portion of the predetermined time period;
after a beginning portion of the predetermined time period, determining, using the processing means, if a change measured relative to the reference value of the signal between a time increment and a consecutive time increment during the predetermined time period exceeds a threshold; and
indicating in a streaming fashion, by at least one of (i) the light emitting element, (ii) the graphical display and (iii) the audio disseminator, a representation of a bubble each instance a threshold change measured occurs.

18. The system of claim 17, further comprises displaying, on the graphical display, a second graphical representation of having no bubble detected for each of the plurality of time increments where the processing means determines the change measured does not meet the threshold.

19. The system of claim 17, wherein the system prior to sensing the signal derived from the fluid within the conduit, the system comprises:

activating at least one electromechanical transducer attached to the conduit before the cooling system is powered on; and
powering the cooling system for flow of the fluid through the conduit.

20. The system of claim 17, wherein the reference value is derived from a maximum peak to peak amplitude measured during the beginning portion of the predetermined time period and the threshold is about 15% of the reference value of the signal.

* * * * *